United States Patent [19]

Burkinshaw

[11] 4,336,970
[45] Jun. 29, 1982

[54] BEARINGS

[75] Inventor: Norman F. Burkinshaw, Greenford, England

[73] Assignee: Vandervell Products Limited, Maidenhead, England

[21] Appl. No.: 161,819

[22] Filed: Jun. 23, 1980

[51] Int. Cl.³ .................. F16C 33/10; B61F 17/30
[52] U.S. Cl. ........................ 308/79 R; 308/79.1; 308/183
[58] Field of Search ............ 308/41, 79, 79.1, 80, 308/83, 87 A

[56] References Cited

U.S. PATENT DOCUMENTS

| 7,800 | 7/1877 | Tomlinson | 308/80 |
| 2,041,390 | 5/1936 | Bary | 308/79.1 |
| 2,185,664 | 1/1940 | Harry | 308/79 R |
| 2,829,015 | 4/1958 | Holin | 308/79 R |
| 2,926,970 | 3/1960 | Clark | 308/83 |
| 2,946,630 | 7/1960 | Smith | 308/79 |
| 2,948,571 | 8/1960 | Cox | 308/79 |
| 3,980,353 | 9/1976 | Hill | 308/79.1 |
| 4,212,505 | 7/1980 | Dolton | 308/79 |
| 4,229,057 | 10/1980 | Howse | 308/79.1 |

FOREIGN PATENT DOCUMENTS 635085  9/1936  Fed. Rep. of Germany ..... 308/79.1

Primary Examiner—Richard R. Stearns
Attorney, Agent, or Firm—Merriam, Marshall & Bicknell

[57] ABSTRACT

A railway bearing assembly comprising a rotatable axle 14 within a cylindrical bearing liner 12 in a housing is provided with a baffle 40 between the outboard end of the axle and the end of the housing. The baffle 40 defines a space in an upper end region of the housing in free communication with atmosphere by means of a breather plug 56; the shape and configuration of the baffle being such as to prevent lubricant within the housing from being violently propelled into said space during rotation of the axle in the bearing.

8 Claims, 6 Drawing Figures

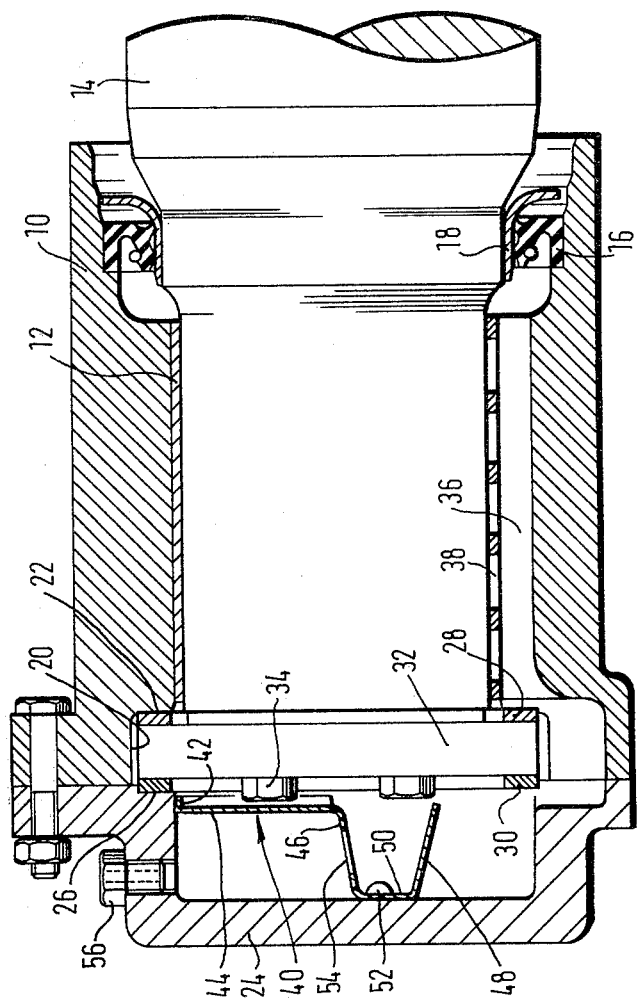

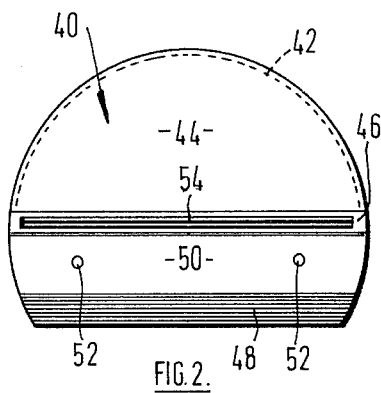
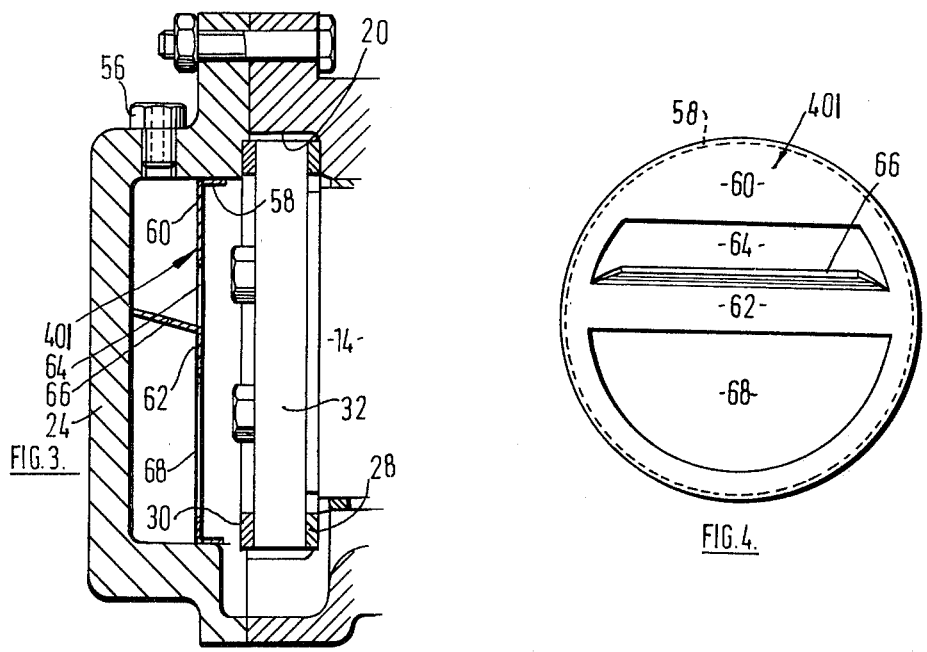

BEARINGS

BACKGROUND OF THE INVENTION

1. Field of the Invention

This invention relates to bearings and is particularly, but not exclusively, applicable to bearings for railway vehicles. Certain types of railway bearings are described in our British Pat. No. 1464177 wherein a cylindrical bearing liner is mounted in a bearing housing and has a cylindrical bearing surface to receive the axle from one end of the housing. The housing includes a hollow end cap secured to the other end to provide a reservoir for holding a lubricant supply and a delivery passage for lubricant extends from the reservoir to a bottom region of the bearing surface of the bearing liner to permit flow of lubricant from the reservoir to the liner. The housing also provides oppositely facing annular thrust faces for engaging oppositely facing thrust faces on the axle.

Lubricant, usually grease, is inserted into the housing through a filler plug and is generally intended to last for the life of the bearing which is sealed at its inboard end by means of a lip seal mounted in the housing between the housing and the axle. It has been found in practice that under certain conditions of volume of grease within the housing and end cap and at certain high temperatures, excessive pressure is developed inside the housing which may adversely affect the operation of the seal. Also in certain constructions of bearings of the type described in British Pat. No. 1464177, notably those wherein the axial thrust faces are provided on opposite sides of an end disc secured to the axle, the effect of the axles rotation coupled with the axial oscillation of the disc occurring in use tends either to exert excessive pressure on the inside of the seal at the inboard end of the housing or to discharge lubricant through any simple form of breather which has not been designed to separate air from lubricant. It will be appreciated that some form of breather is required in the end cap to relieve the air expansion which occurs as the running temperature rises.

It is an object of the present invention to provide a new or improved construction of bearing which will obviate the problems referred to above.

SUMMARY OF THE INVENTION

In accordance with the invention there is provided a bearing assembly for an axle comprising a housing having at least one cylindrical bearing liner mounted therein and having a cylindrical bearing surface to receive the axle from one end of the housing, sealing means at said one end of the housing to form a lubricant seal with the axle, oppositely facing annular thrust faces on the housing for engaging oppositely facing annular thrust faces on the axle, the housing including a hollow end cap at said other end providing a lubricant reservoir, a delivery passage extending from the reservoir to a bottom region of the bearing surface of the bearing liner to permit flow of lubricant from the reservoir to the liner, baffle means interposed between the inner surface of the end cap and the adjacent end of the axle arranged so as to minimize the amount of lubricant directed towards the upper region of the end cap during rotation of the axle and breather means in said upper region of the end cap in communication with the atmosphere.

The baffle means conveniently includes at least one deflector plate extending from the baffle to the interior surface of the end cap to define a space between the remainder of the baffle and the end cap, said breather means being in communication with said space. One or more apertures are provided in the baffle affording communication between said space and the lubricant reservoir.

BRIEF DESCRIPTION OF THE DRAWINGS

Other features of the invention will become apparent from the following description given herein solely by way of example with reference to the accompanying drawings wherein;

FIG. 1 is a side cross-sectional view through a railway axle bearing assembly showing baffle and breather means in accordance with the invention;

FIG. 2 is an end view of the baffle of FIG. 1;

FIG. 3 is a scrap side cross-sectional view of the outboard end of the railway bearing assembly of FIG. 1 but showing an alternative form of baffle;

FIG. 4 is an end view of the baffle of FIG. 3;

DESCRIPTION OF PREFERRED EMBODIMENT

Figure 5:
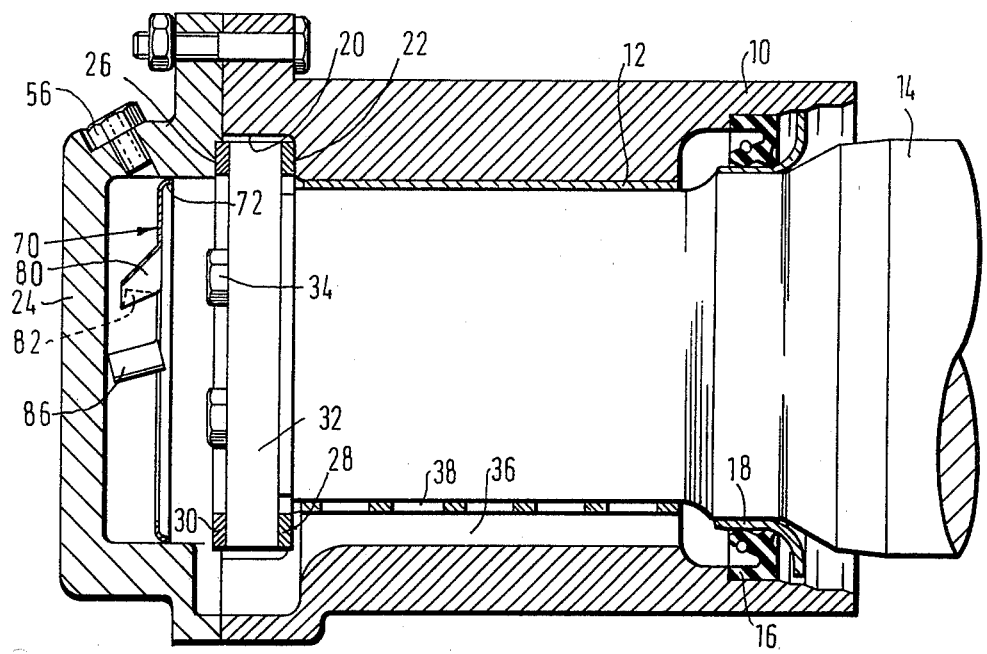
FIG. 5 is a side cross-sectional view through a railway axle bearing assembly showing a still further alternative form of baffle.

In FIG. 1 of the drawings there is illustrated a railway bearing assembly of a type described in British Pat. No. 1464177. The bearing comprises a housing 10 having a cylindrical main bore in which a cylindrical bearing liner 12 is mounted to receive the axle 14 of a wheel; the external diameter of the axle 14 being slightly less than the internal diameter of the liner 12. The cylindrical bearing liner 12 is formed of a thin wall flexible material conveniently a lead based babbit-metal on a steel backing.

At the inner end of the bearing housing 10 through which the axle 14 projects, the housing is formed with a stepped counter-bore which includes a seat in which an annular lip type seal 16 is mounted. The seal 16 runs on a metal sleeve 18 pressed onto the periphery of the axle and the sleeve is formed with an outwardly directed annular flange at the end thereof adjacent the end of the housing which substantially closes the gap between the axle and the counter-bore to exclude dirt and other foreign matter from entering the housing.

The outer end of the housing 10 is formed with a counter-bore 20 spaced by an outwardly facing shoulder 22 from the main bore. The outer end of the housing 10 is closed by a cup-shaped cap 24 and secured around its periphery to the housing 10 by means of high expansion bolts and stiff nuts and providing an inwardly facing annular shoulder 26 opposed to and spaced from the shoulder 22.

The shoulder 22 on the housing is formed with an annular recess providing a seating for an annular thrust washer 28 which may be a complete annulus or in arcuate segments facing axially towards the end cap 24; such thrust washer conveniently comprising a steel backed lead based babbit-metal. The shoulder 26 on the end cap is formed with a similar annular recess providing a seating for a similar annular thrust washer 30 which faces axially towards the first thrust washer 28. The extreme end of the axle 14 is formed with a reduced diameter spigot and a thrust disc 32 is mounted on the spigot by means of axially extending bolts 34 extending through the disc 32 and engaged within the spigot. The thrust disc 32 engages between the thrust washers 28-30 to locate the axle axially within the bearing.

The lower part of the bearing housing 10 is formed with an axially extending groove 36 which is in communication at one end with the inner side of the end cap 24 which provides a reservoir for a lubricant. The axial groove 36 feeds lubricant from the groove onto the rotating axle 14 in the liner 12 by means of a plurality of apertures 38 formed in the liner 12. The inner surface of the liner may be formed with surface grooves to distribute lubricant over the surface of the axle which engages the liner.

Referring now to both FIGS. 1 and 2 there is shown a baffle 40 interposed between the outboard side of the disc 32 and the inner surface of the end cap 24. The baffle 40 is formed of thin sheet metal and comprises an upper flange 42 extending around approximately 180° of the baffle to engage with the upper radial surface of the end cap. From the flange 42 a D-shaped planar portion 44 of the baffle extends downwardly and is then inclined downwardly and outwardly to provide a first deflector plate 46, the axially outer end of which is in contact with the inner surface of the end cap 24. A second lower deflector plate 48 extends axially inwardly and downwardly away from the inner surface of the end cap 24 and is interconnected with the upper deflector plate 46 by means of a web portion 50. The web portion 50 is provided with two apertures by means of which it may be secured such as by screws 52 to the inner surface of the end cap 24.

A slot 54 is provided in the upper deflector plate 46 which slot extends substantially across the full diameter of the baffle 40. The upper deflector plate 46 together with the planar portion 44 of the baffle thus define a space adjacent the upper region of the end cap which space is only in communication with the remainder of the lubricant reservoir afforded by the end cap by virtue of the slot 54. Within said space there is provided a breather 56 in the end cap which breather is in communication with the atmosphere by means of a labyrinthine internal baffle arrangement (not illustrated).

An alternative baffle 401 is shown in FIGS. 3 and 4, such baffle 401 being formed of a thin sheet metal material and including an annular peripheral flange 58 enabling the baffle to be press fitted as illustrated within the confines of the end cap 24. The baffle 401 further includes an upper planar portion 60 and lower planar portion 62 separated from one another by means of a slot 64. From the lower edge of such slot 64 a deflector plate 66 inclines upwardly and axially outwardly from the baffle 401 into contact with the inner surface of the end cap 24. The remainder of the baffle 401 comprises a large D-shaped aperture 68.

In this construction the deflector plate 66 again defines a space between the remainder of the baffle 401 and the end cap in communication with the breather 56.

Figure 6:
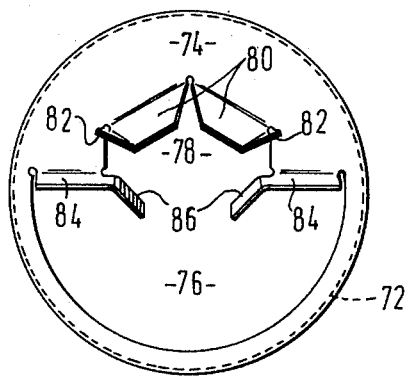
FIG. 6 is an end view of the baffle of FIG. 5.

A further alternative construction of baffle 70 is illustrated in FIGS. 5 and 6, such baffle again being formed of a thin sheet metal material interposed between the outboard side of the disc 32 and the inner surface of the end cap 24.

The baffle includes an upper generally semi-circular baffle plate portion 74 having a continuous peripheral flange 72 in engagement with the circumferential inner surface of the end cap 24. A lower generally semi-circular aperture 76 is provided below the portion 74 and upper deflector plates 80 are pressed out of the plane of the plate portion 74 to provide an upper aperture 78 extending upwardly from the aperture 76. The plates 80 extend downwardly and outwardly of the portion 74 towards the interior surface of the end cap 24 to provide an upper central V-shaped aperture therebetween at their inner ends. The outer end 82 of each plate 80 is turned outwardly of the plane of the plate.

A pair of lower deflector plates 84 extend downwardly and outwardly from the lower edge of the portion 74 towards the interior surface of the end cap 24 and into contact therewith. The radially inner end 86 of each plate 84 is turned out of the plane of the plate to extend axially inwardly of the baffle.

A space is thus defined above the lower deflector plates 84 and between the portion 74 and the interior surface of the end cap 24, such space communicating with the remainder of the lubricant reservoir afforded by the end cap 24 by the provision of the apertures 76 and 88. Within said space the breather 56 is in communication with atmosphere by means of an internal labyrinthine baffle arrangement (not shown). The breather 56 is mounted in the upper portion of the end cap 24 and has its axis inclined to the vertical to prevent any lubricant being projected therethrough during high speed rotation of the axle 14 as such lubricant may be projected vertically upwardly through the V-shaped aperture between the upper deflector plates 80.

In use it will be appreciated that the rotating axle 14 will impart a great deal of agitation to the lubricant contained within the end cap particularly by the action of the securing bolts 34. However the provision and shape of the baffle means ensures that the minimum amount of lubricant is directed towards the upper region of the end cap and into the space defined between the deflector plates of the baffle and the inner surface of the end cap. Such an arrangement means that the breather 56 may be of a type having direct communication with the atmosphere since there will not be any tendency for lubricant to be propelled directly out of the breather.

I claim:

1. A bearing assembly for an axle comprising a housing having at least one cylindrical bearing liner mounted therein and having a cylindrical bearing surface to receive the axle from one end of the housing, sealing means at said one end of the housing to form a lubricant seal with the axle, oppositely facing annular thrust faces on the housing for engaging oppositely facing annular thrust faces on the axle, the housing including a hollow end cap at said other end providing a lubricant reservoir, a delivery passage extending from the reservoir to a bottom region of the bearing surface of the bearing liner to permit flow of lubricant from the reservoir to the liner, baffle means interposed between the inner surface of the end cap and the adjacent end of the axle including at least one deflector plate extending from the baffle to the interior surface of the end cap to define a space between the remainder of the baffle and the end cap, and breather means in said upper region of the end cap in communication with the atmosphere and with said space.

2. A bearing assembly as claimed in claim 1 wherein the oppositely facing annular thrust faces on the axle are provided on a thrust disc secured to the said adjacent end of the axle and the thrust faces on the housing are provided on the end cap and main part of the housing respectively to engage the said thrust faces of the thrust disc.

3. A bearing assembly as claimed in claim 1 wherein one or more apertures are provided in the baffle affording communication between said space and the lubricant reservoir.

4. A bearing assembly as claimed in claim 3 wherein the baffle means comprises a baffle plate having a first said deflector plate extending axially outwardly and downwardly from said baffle plate towards the interior surface of the end cap with a said aperture provided in said deflector plate.

5. A bearing assembly as claimed in claim 4 wherein a second deflector plate is provided extending axially inwardly and downwardly from the interior surface of the end cap.

6. A bearing assembly as claimed in claim 5 wherein a web portion inter-connects said first and second deflector plates and is secured to the interior surface of the end cap.

7. A bearing assembly as claimed in claim 3 wherein the baffle means comprises a baffle plate having a deflector plate extending axially outwardly and upwardly therefrom towards the interior surface of the end cap, a first said aperture being provided in the baffle plate above the deflector plate and a second said aperture being provided in the baffle plate below the deflector plate.

8. A bearing assembly as claimed in claim 3 wherein the baffle means comprises a baffle plate, a pair of upper inclined deflector plates extending downwardly and outwardly of the baffle plate towards the interior surface of the end cap and a pair of lower inclined deflector plates extending downwardly and outwardly of said baffle plate towards the interior surface of the end cap, a said aperture being provided in the baffle plate.

* * * * *